Aug. 3, 1943.   P. J. ANDERSON   2,325,579
GROUND WORKING TOOL FOR AGRICULTURAL IMPLEMENTS
Filed Aug. 28, 1940   2 Sheets-Sheet 1
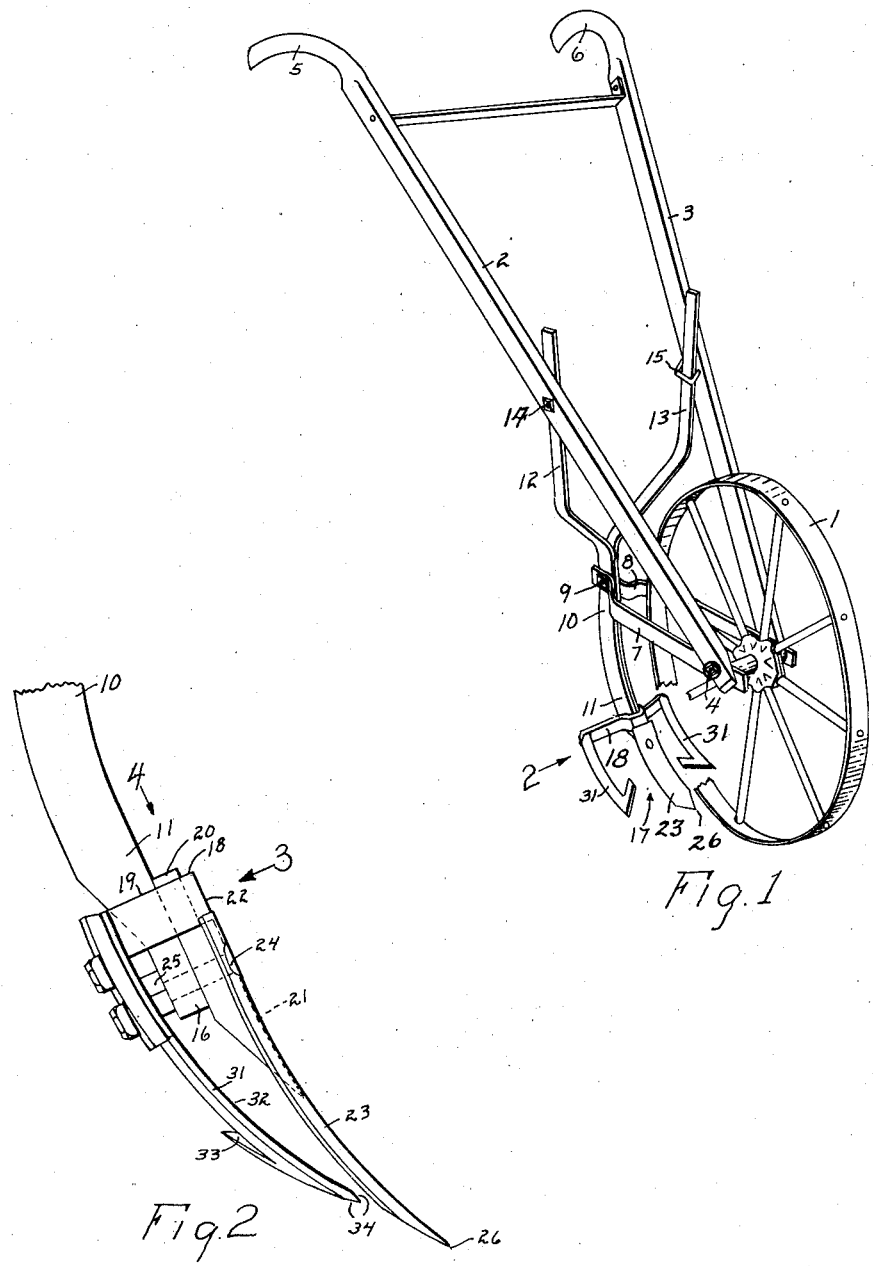
INVENTOR.
Perle J. Anderson
BY Harry R. Canfield
ATTORNEY.

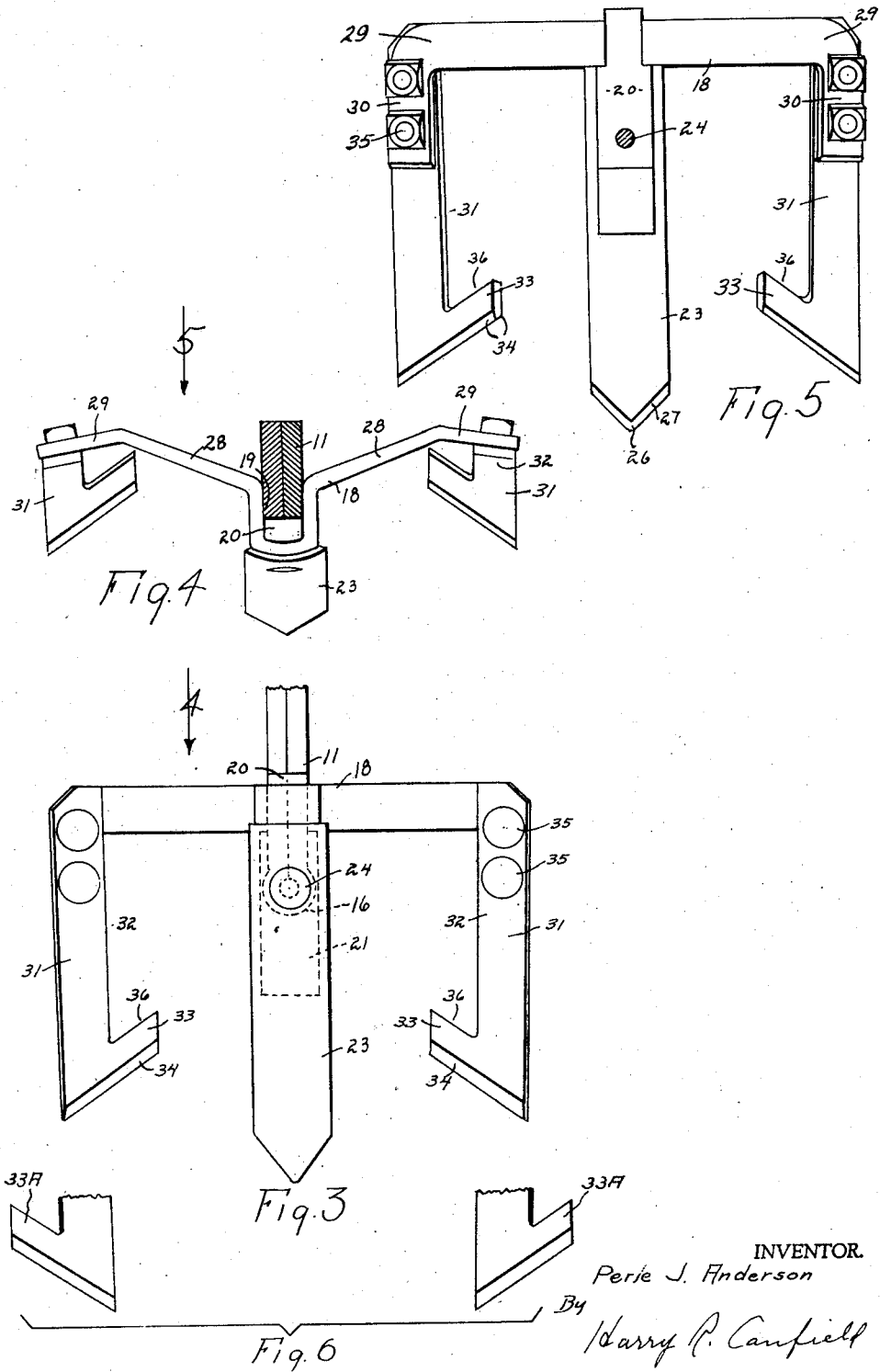

Patented Aug. 3, 1943

2,325,579

UNITED STATES PATENT OFFICE 2,325,579

GROUND WORKING TOOL FOR AGRICULTURAL IMPLEMENTS

Perle Jay Anderson, Portland, N. Y.

Application August 28, 1940, Serial No. 354,546

5 Claims. (Cl. 97—201)

This invention relates to agricultural implements and particularly to ground working tools therefor.

A type of agricultural implement is well known comprising rearwardly extending handles and a forward ground wheel and a frame supporting a ground working tool. The tool of the present invention is particularly applicable to implements of this type and will be illustrated and described herein as associated with such an implement, but the tool may be mounted upon other types of implements; for example a number of tools may be mounted in a gang upon a suitable frame; and therefore my invention is not limited to use with the type of implement mentioned above.

It is among the objects of the present invention:

To provide generally an agricultural ground working tool of improved construction and operable to effect in an improved manner, breaking of the soil and pulverizing and mulching of the same;

To provide an agricultural tool of the type referred to constructed to require the minimal force to propel it through the soil;

To provide an agricultural tool having an optimum position for working the soil and means for supporting it on a propelling implement in such optimum position.

Other objects will be apparent to those skilled in the art to which my invention appertains.

My invention is fully disclosed in the following description taken in connection with the accompanying drawings, in which:

Fig. 1 is a perspective view illustrating an implement of the ground wheel and rearwardly extending handle type, and with a ground working tool embodying my invention mounted thereon;

Fig. 2 is a side elevational view to enlarged scale of the tool of Fig. 1, the view being taken in the direction of the arrow 2 of Fig. 1;

Fig. 3 is a view taken in the direction of the arrow 3 of Fig. 2;

Fig. 4 is a view taken in the direction of the arrow 4 of Fig. 3, and with a standard of the propelling implement shown in cross-section;

Fig. 5 is a view taken in the direction of the arrow 5 of Fig. 4.

Fig. 6 is a fragmentary view similar to a part of Fig. 3 illustrating a modification.

Referring to the drawings, Fig. 1, I have shown at 1 the wheel of an implement and at 2 and 3 respectively rearwardly extending handles mounted at their forward ends upon the axle bolt 4 of the wheel and extending rearwardly upwardly therefrom and having at their rearward ends, handle grips 5 and 6. Side bars 7 and 8 also engaged with the axle bolt 4 extend rearwardly therefrom on opposite sides of the wheel and at their rearward ends are converged and connected by a bolt 9 to a standard shown generally at 10. The standard in the lower part thereof as at 11 is preferably rectilinear extending upwardly rearwardly from the ground plane and in this part is of double thickness metal; the upper part of the standard 10 above the bolt 9 having the two parts of the metal thereof spaced apart as at 12 and 13 and these parts are adjustably secured to the handle bars 2 and 3 respectively. The preferred adjustable connection is to provide J-bolts 14 and 15 extending through the handle bars 2 and 3, and the J's of the bolts embracing the upright portions 12 and 13; whereby when the bolts are loosened the handles may be raised and lowered on the uprights 12 and 13, and when the bolts are tightened the handles are secured in such adjusted positions. This construction provides means for adjustably changing the elevation of the handle grips 5 and 6 above the ground plane.

As stated above, the lower portion 11 of the standard 10 is of double thickness and this may be effected by bending a bar of metal at its middle point, and at such middle point an eye 16, see Figs. 2 and 3, is provided.

The tool to which this invention more particularly relates is shown in Fig. 1 generally at 17 and to enlarged scale in the other figures. The tool is constructed as follows. A head 18 is formed preferably from steel bar material and at a middle point thereof is bent, see particularly Figs. 2 and 4, to provide a rearwardly concave U-form receptacle 19. Within the receptacle is disposed a tongue 20 preferably secured therein by welding it to the walls of the receptacle. The lower end portion of the standard 10, including the eye 16 thereon, lies upon the rearward side of the tongue 20. The forward face 21 of the tongue is rounded convexly and constitutes a continuation of the forward face 22 of the receptacle, as shown in Fig. 2.

A middle blade 23, forwardly convex and rearwardly concave in the transverse direction, lies upon the forwardly convex faces 21 and 22 referred to, and is secured thereon by a bolt 24 projected through the blade, and through the tongue 20 and eye 16 and having a nut 25 rearwardly of the eye.

The blade 23 considered longitudinally is forwardly concave, although considered transversely is forwardly convex as plainly shown in Figs. 2 and 4. The upper part of the blade 23, by virtue of its conformity with the tongue 20 extends generally in the same direction as the lower part of the standard 11. The blade 23 has a point 26 on its lower end, and the point is preferably beveled as shown at 27, Fig. 5.

As shown in Fig. 4, the walls of the U-shaped receptacle 19 continue into rearwardly inclined oppositely extending arms 28—28, the opposite end portions 29 of which are bent forwardly to provide side blade supports, and to more rigidly mount side blades thereon, the supports 29 are at their ends bent downwardly into fingers 30—30 as best shown in Fig. 5.

Side blades 31—31 are mounted on the fingers 30—30. These blades 31—31 are downwardly inclined and are forwardly concave as shown in Fig. 2, and because of the forward inclination of the supports 29 and 30, the faces 32—32 of the side blades are turned toward each other or toward the middle blade 23 and as these side blades 31—31 are propelled through the soil, the faces 32—32 therefore have what may be called a mold-board turning action which throws the soil toward the middle blade 23.

At the lower ends of the side blades 31—31 they are provided with inwardly extending upwardly inclined wings 33—33 the lower edges 34—34 of which are beveled preferably on both the forward and the rearward faces of the wings.

The side blades 31—31 are secured to their supports 29—29 by bolts 35—35.

While as stated, the middle blade 23 and the side blades 31—31 are downwardly forwardly inclined and forwardly concave in their longitudinal directions, the middle blade 23 is preferably inclined to the ground plane at a steeper angle than the side blades 31—31; and is preferably longer than the side blades.

The angles which the blades 31—31 and 23 make with the ground will of course vary with different depths of the blades in the soil in use, and for convenience of reference, this angle may be predetermined when the ground wheel 1 and the point 26 of the middle blade are both on the ground plane and in such position of the tool the lower portion 11 of the standard 10 is made so that it will at such position of the tool have an angle of approximately 60 degrees with the ground plane.

In the operation of the tool above described, as the wheel 1 is propelled forwardly, the blades of the tool penetrate into the soil by what is known in the agricultural implement art as suction, and no downward pressure on the handle grips 5 and 6 is necessary to effect this result. The deeper the blades penetrate into the soil, the less becomes their inclination with the horizontal, and this angle of inclination decreases rapidly as the depth increases, because of the relatively small inclination with the horizontal when the tool is on the ground with zero penetration, with the result that at all depths of penetration little forward propulsive force is necessary.

The middle blade 23 raises the soil and divides it throwing it toward the side blades 31—31, and these blades because of the moldboard action of the faces 32—32 referred to, lift and throw the soil toward the middle blade. The soil is thus given a double tumbling action which pulverizes and mulches the same. The cutting and pulverizing action is further promoted by the sharp double edges 34—34 of the wings of the side blades. Also, the soil flows over the rearward edges 36—36 of the wings giving it a further tumbling action and turning over weeds which may have been uprooted.

The mold-board shape of the side blades 31—31 by throwing the soil toward the middle blade has the effect of confining the action of the tool on the soil to a zone having a width of the over-all width of the tool and within this zone the soil as stated is thoroughly crumbled and pulverized and mulched, as distinguished from the action of known tools in which some of the soil which is raised by the tool is thrown out of the path of the tool in lumps or clods and the tool passes by without any further action on such lumps.

The inward rearward inclination of the edges 34 causes them to perform a cutting and slicing action which reduces the necessary propulsion force of the tool and enables them to raise the soil before turning it as described. The mold board turning action of the side blades as described turns weeds and trash so as to prevent clogging thereof.

As a modification, the wings 33—33 may extend laterally outwardly instead of inwardly, as shown in Fig. 6, at 33A—33A.

It will be apparent that the foregoing improved soil-working action of the tool does not depend upon the exact details of the construction illustrated and described and that changes and modifications may be made therein within the spirit of my invention without sacrificing the aforesaid advantages and which come within the scope of the appended claims.

I claim:

1. In an agricultural soil working tool, a transverse head comprising side blade supports and a middle blade support; forwardly downwardly inclined elongated side blades and a middle blade dependingly secured to the side and middle blade supports respectively; the side blade supports being inclined forwardly in the direction of motion of the tool when in use and the side blades having forward longitudinally concave faces inclined transversely rearwardly, whereby to elevate longitudinally of the side blades the soil through which they are propelled and to deflect and tumble it with a mold board turning action; and means to attach the tool to an implement to support it in the position described herein.

2. In an agricultural soil working tool, a transverse head comprising a pair of side blade supports and a middle blade support between the side blade supports, each of the side blade supports having a blade supporting portion inclined forwardly horizontally in the direction of motion of the tool when in use; an elongated side blade secured to and downwardly forwardly inclined from each blade supporting portion, the forward face of each side blade being longitudinally concave and inclined rearwardly toward the other side blade, whereby to elevate longitudinally of the side blades the soil through which they are propelled to deflect and tumble it toward each other with a mold board turning action; a middle blade secured to the middle blade support and depending therefrom forwardly of the side blades; and means to attach the tool to an implement to support it in the position described herein.

3. In an agricultural soil working tool, a transverse head comprising a pair of side blade supports and a middle blade support between the side blade supports; forwardly downwardly inclined elongated side blades and a middle blade dependingly carried by the side and middle blade supports respectively; the side blade supports being inclined forwardly in the direction of motion of the tool when in use, the side blades having forward longitudinally concave faces which extend downwardly forwardly and which are inclined transversely rearwardly, and the lower portions of the side blades extending transversely rearwardly to form lateral blade wings which provide lateral extensions of the aforesaid forward blade faces, whereby to elevate longitudinally of the side blades the soil through which they are propelled and to deflect and tumble it with a mold board turning action; and means to attach the tool to an implement to support it in the position described herein.

4. In an agricultural soil working tool, a transverse head comprising a middle blade support and a side blade support at each end of the transverse head; elongated side blades carried by and downwardly forwardly inclined from the side blade supports; a middle blade carried by the middle blade support dependingly and forwardly of the side blades; the side supports being inclined forwardly in the direction of motion of the tool when in use, each side blade having a forward longitudinally concave face which extends downwardly forwardly and which is inclined rearwardly toward the middle of the tool, and the lower portion of each side blade extending laterally rearwardly and thus providing a lateral extension of the forward blade face, whereby to elevate longitudinally of the side blades the soil through which they are propelled and to deflect and tumble it toward the middle blade with a mold board turning action; and means to attach the tool to an implement to support it in the position described herein.

5. An agricultural soil working tool comprising a frame having means for attaching the tool to an implement to support the tool in operative position, a middle blade, a pair of side blades, and means for supporting the middle blade and the side blades on the frame, the last-mentioned means including a middle support to which the middle blade is dependingly secured and side supports to which the side blades are secured in a downwardly forwardly inclined position, each side blade having an elongated longitudinally concave forward face, and the forward face of each side blade being transversely rearwardly inclined with respect to the direction of movement of the tool when in use, and the transverse inclination of each face being toward the other whereby to elevate longitudinally of the side blades the soil through which they are propelled and to deflect and tumble it with a mold board turning action toward the middle blade.

PERLE JAY ANDERSON.